(12) United States Patent
Heimbuch

(10) Patent No.: US 6,173,664 B1
(45) Date of Patent: Jan. 16, 2001

(54) EQUIDISTANT PLANTING SYSTEM

(76) Inventor: Thomas A. Heimbuch, 9748-122nd Ave. SE., Cogswell, ND (US) 58017

(*) Notice: Under 35 U.S.C. 154(b), the term of this patent shall be extended for 0 days.

(21) Appl. No.: 09/361,708

(22) Filed: Jul. 27, 1999

(51) Int. Cl.[7] .................................................. G01L 7/04
(52) U.S. Cl. .......................... 111/178; 111/171; 221/211
(58) Field of Search ........................... 111/177, 178, 111/185, 179, 180, 181, 182, 77, 76, 75, 171; 221/211, 263, 266, 277, 264, 265

(56) References Cited

U.S. PATENT DOCUMENTS

| | | | |
|---|---|---|---|
| 3,572,547 | * | 3/1971 | Walberg ............................. 221/260 |
| 3,636,897 | * | 1/1972 | Brink ................................... 111/77 |
| 4,027,606 | * | 6/1977 | Knapp ................................. 111/77 |
| 4,241,849 | * | 12/1980 | Harrer ............................. 111/77 X |
| 4,449,642 | * | 5/1984 | Dooley ............................. 221/211 |
| 5,392,707 | * | 2/1995 | Romans ............................ 111/185 |
| 5,542,364 | * | 8/1996 | Romans ............................ 111/185 |
| 5,992,338 | * | 11/1999 | Romans ............................ 111/171 |

* cited by examiner

Primary Examiner—Robert E. Pezzuto
(74) Attorney, Agent, or Firm—Michael S. Neustel

(57) ABSTRACT

An equidistant planting system for accurately placing seeds in a furrow thereby providing increased crop yields. The inventive device includes a seed singulator device, a delivery tube extending from the singulator device, and a placement device connected to the delivery tube for dispersing the seed uniformly within the furrow. The placement device comprises a ring member, an opening within the lower portion of the ring member, a disk member rotatably positioned within the ring member, a mechanical drive for rotating the disk member, a cover attached to the ring member, a plurality of inner members attached to the disk member, and a corresponding plurality of guide members attached to the disk member adjacent the corresponding inner members. The guide members form a tapering passageway for guiding the seed into a narrow retaining passage for delivering the seed through the opening at approximately zero velocity from a finite vertical distance for reducing movement of the seed after placement within the furrow.

14 Claims, 4 Drawing Sheets

EQUIDISTANT PLANTING SYSTEM

BACKGROUND OF THE INVENTION

1. Field of the Invention

The present invention relates generally to planter devices and more specifically it relates to an equidistant planting system for accurately placing seeds in a furrow thereby providing increased crop yields.

Research has consistently shown that equidistant placement of plants produces the highest possible yields, quality and uniformity within various types of crops. However, most planter devices do not provide uniform seed placement within the furrow created by an opener. The seeds are placed at unequal distances thereby causing some seeds to be closer to others.

Contributing to this problem is seed movement after release from the planter because of the forward motion of the planter depositing the seed on stationary ground. Because many of the plants are growing closer to one another, their overall growth is stunted because of lack of nutrients, water and sunlight. Hence, there is a need for a planter device tat uniformly places seeds within a furrow for increasing crop yields.

2. Description of the Prior Art

Planter devices have been in use for years. Typically, a planter device includes a storage bin for storage of the seed. Conventional planter devices utilize a singulation system connected to the storage bin, however, a length of tube generally transports the singulated seed to the furrow.

Unfortunately, conventional planter devices do not provide a uniform place of seed within the open furrow. The distance the seed has to travel within the delivery tube is often times greater than 18 inches thereby adding significantly to the inaccuracies between the rows. In addition, the seed often times exits the delivery tube to engage the ground surface at approximately the velocity of the planter device causing a bounce and roll effect. This movement of the seed is undesirable since it contributes to misplacement and uneven placement of the seeds within the open furrow.

Examples of planter devices include U.S. Pat. No. 4,628, 841 to Powilleit; U.S. Pat. No. 4,650,093 to Meyer-Bosse; U.S. Pat. No. 4,515,291 to Holmes; U.S. Pat. No. 4,928,607 to Luigi; U.S. Pat. No. 5,058,766 to Deckler; U.S. Pat. No. 5,632,212 to Barry; U.S. Pat. No. 5,351,634 to Patton; U.S. Pat. No. 4,449,642 to Dooley; U.S. Pat. No. 4,029,028 to Griffiths; U.S. Pat. No. 4,008,826 to Caree which are all illustrative of such prior art.

Powilleit (U.S. Pat. No. 4,628,841) discloses a single grain sowing machine. Powilleit teaches a seed container, a feeding wheel connected to the seed container, and a sowing wheel which rolls on the ground and on the circumference of which there are means which engage the seed grains. In the lower zone of the sowing wheel, the seed grains are pressed into the soil and released.

Meyer-Bosse (U.S. Pat. No. 4,650,093) discloses an apparatus for separating and distributing granular goods. Meyer-Bosse teaches a housing, a bucket wheel rotatable within the housing, and an outer receiving side and an inner side of the bucket wheel.

Holmes (U.S. Pat. No. 4,515,291) discloses a seed planter, planter assembly and method of pickup up and discharging single seeds. Holmes teaches a seed transport member having a plurality of depressions provide with ramp surfaces sloping downwardly. Air is fed into the deepest portion of the depression and a single seed is trapped in this portion by the low pressure region which forms between the seed and the walls of the depression.

Luigi (U.S. Pat. No. 4,928,607) discloses an electronically controlled pneumatic seeder. Luigi teaches a plurality of seed distributors controlled by direct current motors that are controlled by an electronic devices as a function of the forward speed of the seeder.

Dooley (U.S. Pat. No. 4,449,642) discloses an improved seed sower unit and an improved seed supply hopper for the head. Dooley teaches a frame having a seed reservoir, an indexing means within the frame, a latch means for securing the hopper in operating position, and a seed drain gate means.

While these devices may be suitable for the particular purpose to which they address, they are not as suitable for accurately placing seeds in a furrow thereby providing increased crop yields. Conventional planter devices do not provide accurate placement of seed within the furrow. In addition, conventional planter devices do not allow intermittent placement of seed between adjacent rows for achieving the optimum crop growth conditions.

In these respects, the equidistant planting system according to the present invention substantially departs from the conventional concepts and designs of the prior art, and in so doing provides an apparatus primarily developed for the purpose of accurately placing seeds in a furrow thereby providing increased crop yields.

SUMMARY OF THE INVENTION

In view of the foregoing disadvantages inherent in the known types of planter devices now present in the prior art, the present invention provides a new equidistant planting system construction wherein the same can be utilized for accurately placing seeds in a furrow thereby providing increased crop yields.

The general purpose of the present invention, which will be described subsequently in greater detail, is to provide a new equidistant planting system that has many of the advantages of the planter devices mentioned heretofore and many novel features that result in a new equidistant planting system which is not anticipated, rendered obvious, suggested, or even implied by any of the prior art planter devices, either alone or in any combination thereof.

To attain this, the present invention generally comprises a seed singulator device, a delivery tube extending from the singulator device, and a placement device connected to the delivery tube for dispersing the seed uniformly within the furrow. The placement device comprises a ring member, an opening within the lower portion of the ring member, a disk member rotatably positioned within the ring member, a mechanical drive for rotating the disk member, a cover attached to the ring member, a plurality of inner members attached to the disk member, and a corresponding plurality of guide members attached to the disk member adjacent the corresponding inner members. The guide members form a tapering passageway for guiding the seed into a narrow retaining passage for delivering the seed through the opening at approximately zero velocity from a finite vertical distance for reducing movement of the seed after placement within the furrow.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an equidistant planting system that will overcome the shortcomings of the prior art devices.

Another object is to provide an equidistant planting system that provides uniform and even placement of seed within a furrow.

An additional object is to provide an equidistant planting system that increases crop growth, yield, quality and uniformity.

A further object is to provide an equidistant planting system that accurately places seed with respect to adjacent rows thereby allowing intermittent place of seed between adjacent rows.

Another object is to provide an equidistant planting system that reduces seed movement after being placed within the open furrow.

A further object is to provide an equidistant planting system that reduces the vertical distance a seed has to travel uncontrollably prior to being placed within a furrow.

Another object is to provide an equidistant planting system that delivers the seed into the furrow at approximately zero velocity instead of the velocity of the planter.

A further object is to provide an equidistant planting system that allows a user to achieve a diamond shaped equidistant crop placement pattern for maximizing nutrients, water and sunlight to all crop plants.

An additional object is to provide an equidistant planting system that virtually eliminates the planter speed as a factor in determining seed placement.

Another object is to provide an equidistant planting system that provides rapid control of the ground for shading and thereby controlling weed growth which results in reduced herbicide usage.

A further object is to provide an equidistant planting system that provides increased crop uniformity for providing easier harvesting and drying.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
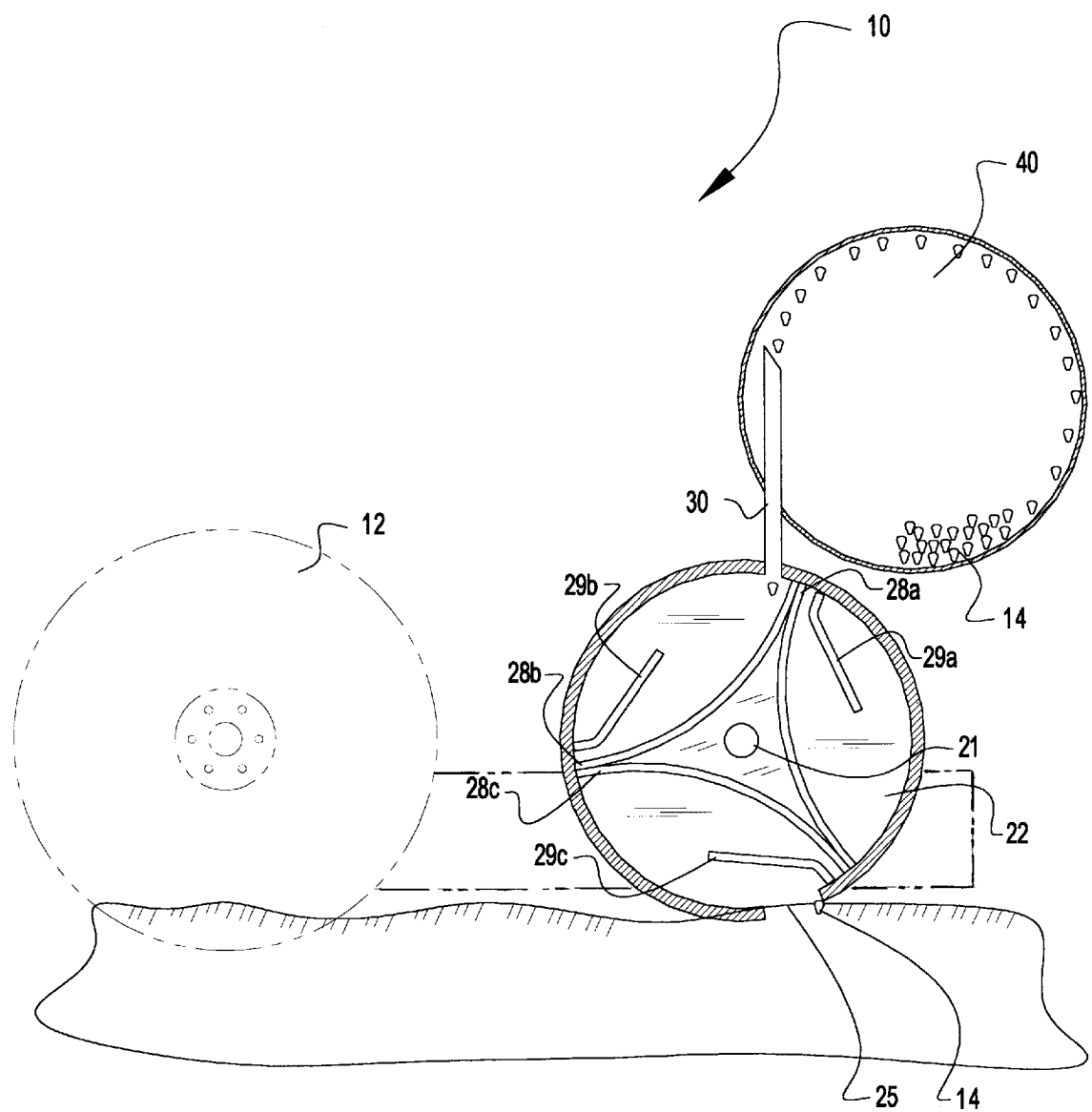
FIG. 1 is a side view of the present invention.

Turning now descriptively to the drawings, in which similar reference characters denote similar elements throughout the several view, FIGS. 1 through 4 illustrate an equidistant planting system 10, which comprises a seed singulator 40 device, a delivery tube 30 extending from the singulator 40 device, and a placement device 20 connected to the delivery tube 30 for dispersing the seed 14 uniformly within the furrow. The placement device 20 comprises a ring member 24, an opening 25 within the lower portion of the ring member 24, a disk member 22 rotatably positioned within the ring member 24, a mechanical drive for rotating the disk member 22, a cover 26 attached to the ring member 24, a plurality of inner members 28a–c attached to the disk member 22, and a corresponding plurality of guide members 29a–c attached to the disk member 22 adjacent the corresponding inner members 28a–c. The guide members 29a–c form a tapering passageway for guiding the seed 14 into a narrow retaining passage for delivering the seed 14 through the opening 25 at approximately zero velocity from a finite vertical distance for reducing movement of the seed 14 after placement within the furrow. The placement device 20 and the seed singulator 40 are attached to a common frame. It can be appreciated that since most planters have more than one row, that the below description can be utilized to construct a multiple row planter system.

As best shown in FIG. 1 of the drawings, a conventional opener 12 is attached to the structure for creating an open furrow in front of the placement device 20. The opener 12 may be comprised of any well-known opener 12 such as disk openers 12 or shoe openers.

Figure 2:
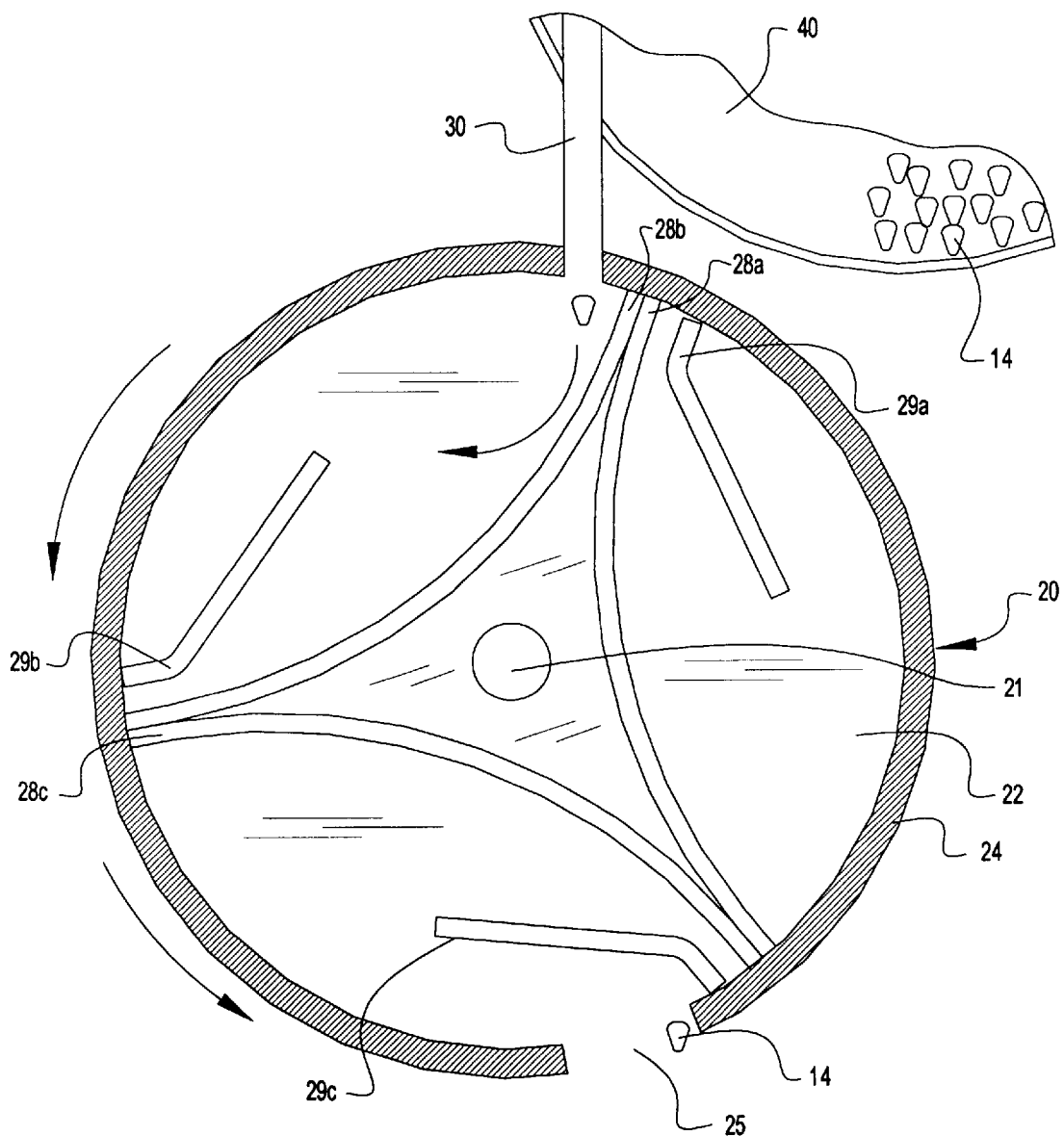
FIG. 2 is a magnified side view showing the placement device.

As best shown in FIG. 1 of the drawings, a conventional seed singulator 40 is provided that singulates the seed 14 from a seed 14 reservoir. The seed singulator 40 may be comprised of any well-known seed singulation system such as those commonly utilized upon corn planters and other planter devices. As shown in FIGS. 1 and 2 of the drawings, a delivery tube 30 extends from the seed singulator 40 for delivering the singulated seed 14 to the placement device 20.

Figure 4:
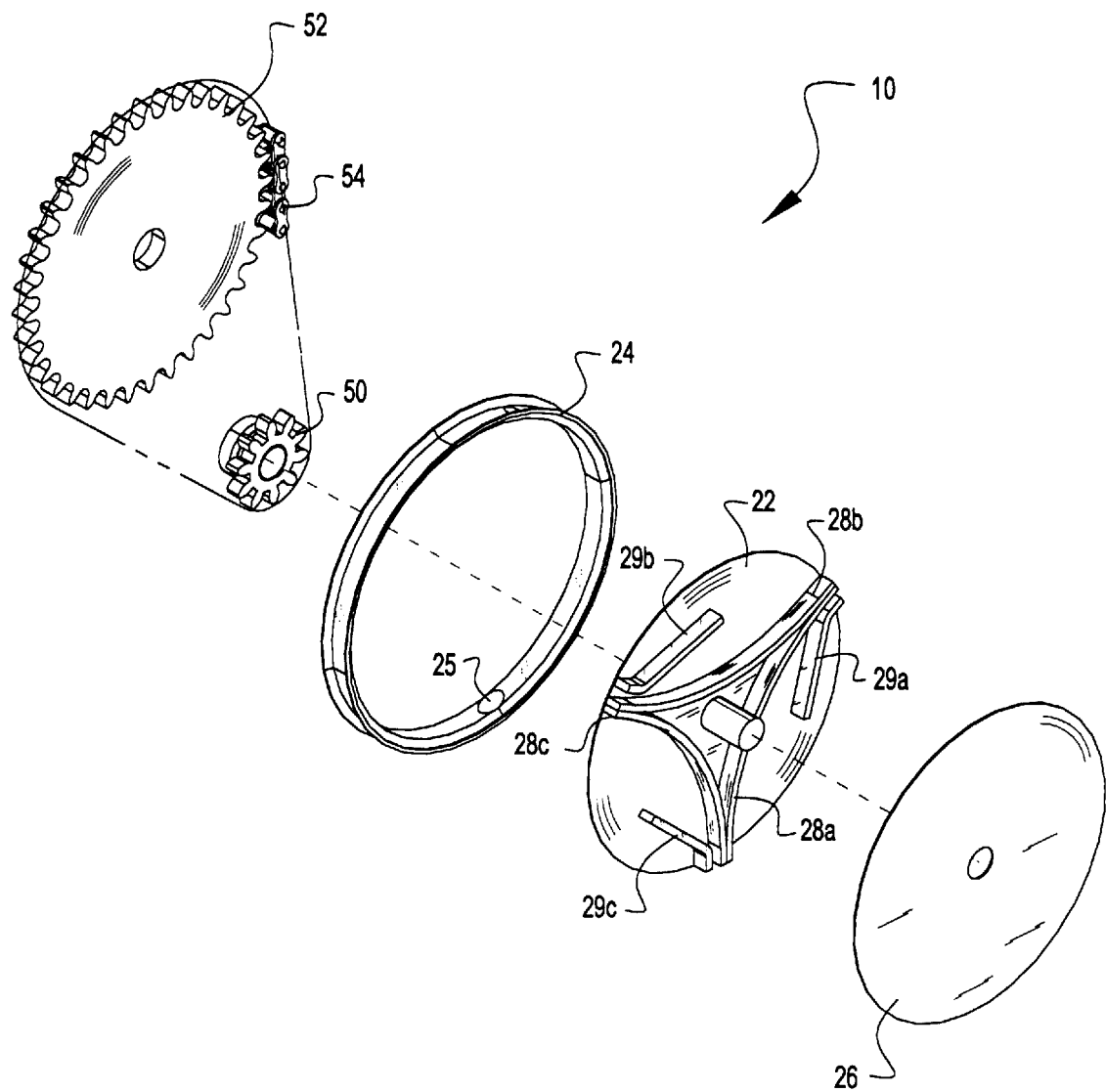
FIG. 4 is an exploded upper perspective view of the present invention.

As shown in FIG. 4 of the drawings, the placement device 20 is mechanically operated by a drive sprocket 50 connected to an axle 21 of the placement device 20. A conventional chain 54 connects the drive sprocket 50 to a main sprocket 52. A drive shaft or other device is connected to the main sprocket 52 for synchronizing all of the rows of the inventive device by rotating each disk member 22 at the same rotational velocity. The disk member 22 is preferably rotated at a speed so that the perimeter tangential velocity is opposite of the planter's velocity so that the seed 14 will exit the placement device 20 at approximately zero velocity for preventing seed 14 movement upon placement within the furrow.

As shown in FIGS. 1 through 4 of the drawings, the placement device 20 comprises a ring member 24 and a disk member 22 rotatably positioned within the ring member 24. The lower end of the deliver tube extends into the upper portion of the ring member 24 as best shown in FIG. 2 of the drawings. As shown in FIG. 4 of the drawings, a cover 26 is attachable to the ring member 24 for enclosing the placement device 20. It can be appreciated by one skilled in the art that the rotatably disk member 22 is not necessarily required, since the inner members 28a–c and/or the guide members 29a–c may be directly connected to the axle 21.

Figure 3:
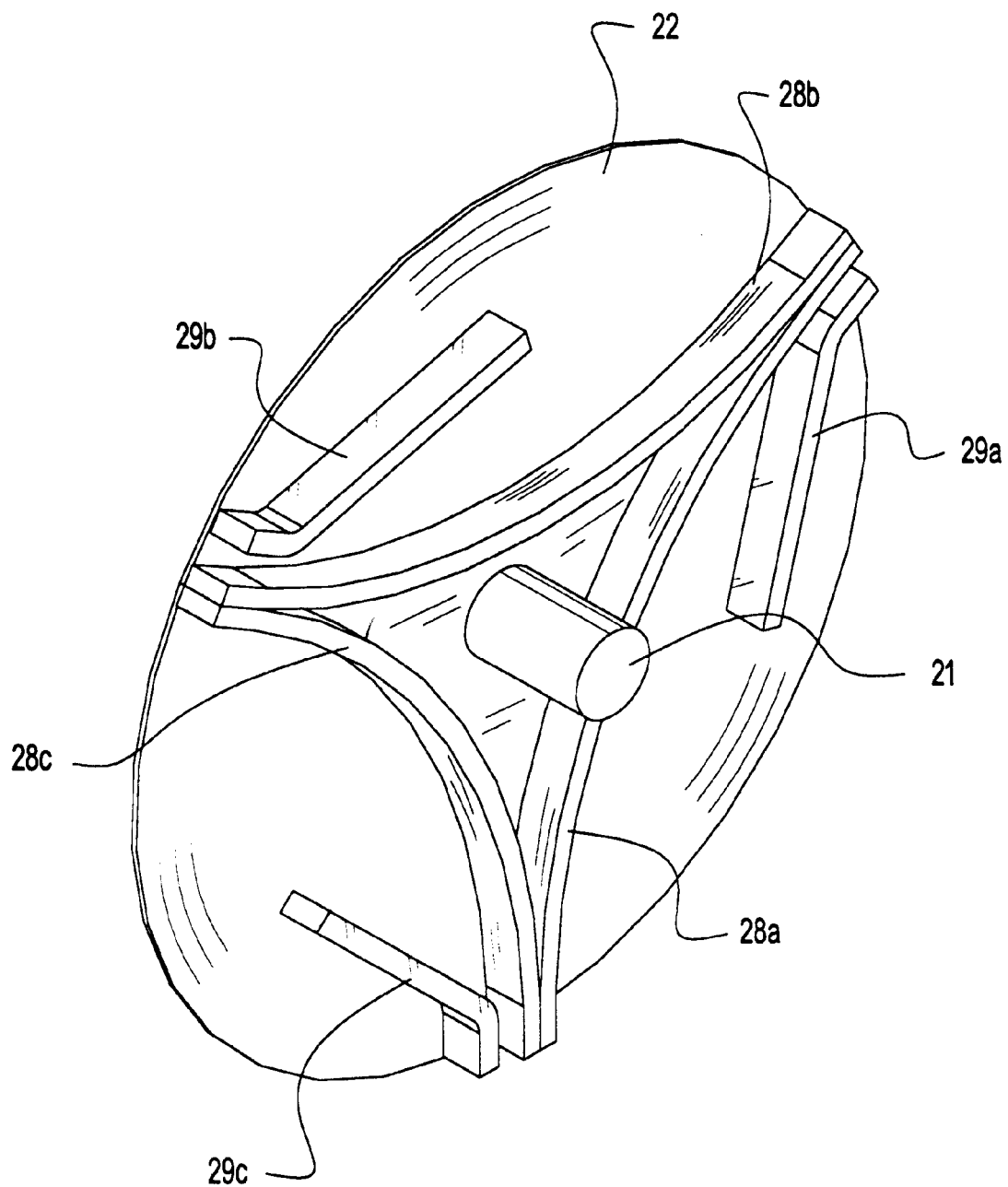
FIG. 3 is an upper perspective view of the placement device.

As best shown in FIG. 3 of the drawings, an axle 21 extends through the center of the disk member 22 and is mechanically connected to the drive sprocket 50 for rotating the disk member 22. A plurality of inner members 28a–c are attached to the side of the disk member 22. There are preferably three inner members 28a–c, however it can be appreciated by one skilled in the art that any number of inner member may be utilized.

Each of the inner members 28a–c creates a pocket or cell that receives a single seed 14 from the delivery tube 30 as best shown in FIG. 2 of the drawings. As best shown in FIGS. 1 through 3, the inner members 28a–c are curved with the middle section closest to the axle 21. The curved inner members 28a–c direct the seed 14 from the delivery tube 30 initially toward the center of the inner members 28a–c. It can be appreciated that various other shapes and curvatures may be utilized for the inner members 28a–c.

As shown in FIGS. 1 through 3 of the drawings, a corresponding plurality of guide members 29a–c are attached to the disk member 22 adjacent the respective inner members 28a–c. The guide members 29a–c form a tapering passageway for the seed 14 to be guided into and retained within during rotational movement of the disk member 22.

As best shown in FIG. 2 of the drawings, the distal ends of the guide members 29a–c and the corresponding inner members 28a–c are substantially parallel to one another and extend substantially radially upon the disk member 22. The inner portion of the guide members 29a–c tapers away from the inner members 28a–c thereby providing a broad opening 25 within the passageway for receiving the seed 14.

As best shown in FIGS. 1 and 2 of the drawings, the opening 25 is within the lower portion of the ring member 24. The opening 25 is preferably positioned slightly to the rear of the center of the ring member 24 for allowing the seed 14 to exit through the opening 25 at a substantially horizontal direction without obstruction. The opening 25 within the ring member 24 is preferably approximately one to four inches above the bottom of the open furrow during operation.

In use, the seed singulator 40 retrieves seed 14 from a hopper and delivers a single seed 14 through the delivery tube 30 into the placement device 20. The seed 14 is dropped into the pocket created by one of the inner members 28a–c and onto the inner member 28. As the disk member 22 rotates, the seed 14 is directed to the front of the placement device 20 upon the inner member 28. After the disk member 22 is rotated approximately 120 degrees, another seed 14 is provided by the seed singulator 40 into the placement device 20. After the disk member 22 has rotated approximately 120 degrees, the first seed 14 is positioned adjacent the opening 25 within the ring member 24 as shown in FIG. 2 of the drawings. The first seed 14 is then captured within the narrow portion between the guide member 29 and the inner member 28 as shown in FIG. 2 of the drawings. As the disk member 22 rotates further, the narrow portion between the guide member 29 and the inner member 28 is exposed to the opening 25 within the ring member 24 thereby allowing the first seed 14 to escape through the opening 25 at a horizontal velocity approximately opposite to the velocity of the planter thereby creating an effective zero velocity for the seed 14 except for the slight vertical velocity that is achieved by traveling from the opening 25 to the lower surface of the furrow. The first seed 14 then engages the bottom of the furrow without rolling or bouncing thereby ensuring proper placement of the first seed 14 within the furrow. Because of the increased accuracy, the adjacent rows being planted by the planter may be staggered so that the seed 14 of the adjacent row is between two of the seeds 14 of the adjacent row thereby maximizing crop yields.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Equidistant Planting System
Environmental Elements 10. equidistant planting system 11. 12. Opener (shoe or disk) 13. 14. Seed 15. 16. 17. 18. 19. 20. Placement Device 21. Axle 22. Disk Member 23. 24. Ring Member 25. Opening 26. Cover 27. 28. Inner Members (a-c) 29. Guide Members (a-c) 30. Delivery Tube 31. 32. 33. 34. 35. 36. 37. 38. 39. 40. Seed Singulator 41. 42. 43. 44. 45. 46. 47. 48. 49. 50. Drive Sprocket 51. 52. Main Sprocket 53. 54. Chain 55. 56. 57. 58. 59. 60. 61. 62. 63. 64. 65. 66. 67. 68. 69. 70. 71. 72. 73. 74. 75. 76. 77. 78. 79.

I claim:

1. An equidistant planting system, comprising:
   a frame;
   a seed singulator attached to said frame;
   a housing structure having a circular interior connected to said seed singulator for receiving singulated seeds, wherein said housing structure has a lower portion in opposition to a ground surface;
   a disk member rotatable positioned within said housing structure, wherein said disk member is mechanically driven by a drive means so that a tangential velocity of an outer perimeter of said disk member adjacent said lower portion of said housing structure is approximately opposite to a velocity of said frame;
   a plurality of compartments within said disk member for receiving and dispersing said singulated seeds;
   an opening within said lower portion of said housing structure, wherein said opening is positioned within said lower portion so that said singulated seed exits in a horizontal path with respect to said housing structure when initially exiting said opening; and
   an opener attached to said frame for creating a furrow.

2. The equidistant planting system of claim 1,
   wherein said disk member further includes a plurality of guide members attached to said disk member within said compartments for guiding said singulated seed to a desired position.

3. The equidistant planting system of claim 2, wherein said plurality of compartments are defined by a plurality of inner members.

4. The equidistant planting system of claim 2, wherein an outer portion of said guide members is substantially parallel to an outer portion of said inner members.

5. The equidistant planting system of claim 2, wherein said guide members taper away from the inner members forming a tapered passageway.

6. The equidistant planting system of claim 1, wherein said housing structure includes an outer ring member having said opening within.

7. The equidistant planting system of claim 6, wherein said opening extends rearwardly from a lower center of said ring member for allowing said singulated seed to escape in a substantially horizontal position.

8. The equidistant planting system of claim 1, wherein said housing structure is fluidly is connected to said seed singulator by a delivery tube.

9. The equidistant planting system of claim 1, wherein said drive means comprises a gear assembly that adjusts the rotational speed of said disk member according to the velocity of the planter.

10. The equidistant planting system of claim 3, wherein said inner members are curved toward a center of said disk member.

11. An equidistant planting system, comprising:
 a frame;
 a seed singulator attached to said frame;
 a seed placement device connected to said seed singulator for receiving singulated seeds and placing said singulated seeds within a furrow;
 an opener attached to said frame for creating said furrow;
 wherein said seed placement device comprises:
  a housing structure having an interior;
  an opening within a lower portion of said housing structure;
  a compartment structure having a plurality of compartments rotatably positioned within said housing structure, wherein said compartment structure rotates from a drive means so that a tangential velocity is approximately opposite of the velocity of the planter; and
  a plurality of guide members attached to said compartment structure within said compartments for guiding said singulated seed to a desired position;
 wherein said plurality of compartments are defined by a plurality of inner members;
 wherein an outer portion of said guide members is substantially parallel to an outer portion of said inner members; and
 wherein said guide members taper away from the inner members forming a tapered passageway.

12. The equidistant planting system of claim 11, wherein said housing structure includes an outer ring member having said opening within.

13. The equidistant planting system of claim 12, wherein said opening extends at least past a center of said ring member for allowing said singulated seed to escape in a substantially horizontal position.

14. A method of planting seeds at precise distances, said method comprising the steps of:
 (a) providing a seed singulator;
 (b) providing a seed placement device for receiving singulated seeds from said seed singulator; and
 (c) dispersing said singulated seeds from said seed placement device into a furrow at a path velocity with respect to a ground surface having a vertical velocity and a horizontal velocity, wherein said vertical velocity and said horizontal velocity are zero immediately upon exiting said seed placement device.

* * * * *